United States Patent Office 3,488,228
Patented Jan. 6, 1970

3,488,228
PROCESS FOR TREATING ALUMINUM BASE ARTICLES
John A. Scott, North Haven, and William H. Anthony, Hamden, Conn., assignors to Olin Mathieson Chemical Corporation, a corporation of Virginia
No Drawing. Continuation-in-part of application Ser. No. 448,288, Apr. 15, 1965. This application Apr. 22, 1968, Ser. No. 723,295
Int. Cl. C23f 7/00; C23c 17/00; C23d 3/00
U.S. Cl. 148—6.27                    11 Claims

ABSTRACT OF THE DISCLOSURE

The present invention is directed to treating aluminum base articles with certain specified amine and hydrazine derivatives in aqueous solution for the purpose of rendering the aluminum adherent to paints and adhesive coatings. Additionally, an effective rinsing solution which may be used after the amine treatment has been found according to the present invention.

DISCLOSURE

The present application is a continuation-in-part of U.S. application Ser. No. 448,288, filed Apr. 15, 1965, now abandoned.

The said Ser. No. 448,288 relates to a process for the treatment of aluminum and to an improve article obtained thereby, and more particularly, to an improved process for treating aluminous metals which serves to improve the treated metal, for example, upon subsequent processing, such as painting or adhesive coating, and further in the resultant treated and coated articles.

It is frequently desirable or necessary to paint or otherwise coat aluminum. For example, in architectural or ornamental applications, aluminum is frequently painted to improve its appearance for a particular application. Similarly, for many applications, it is desirable to coat or clad aluminum with a dissimilar material, for example, a plastic film or a dissimilar metal or alloy.

It is generally necessary to pretreat the aluminum in some manner before coating in order to obtain adequate adhesion between the aluminum and the coating and to obtain adequate durability of the coating. For example, in the continuous application of paint to aluminum strip, it is accepted practice to apply a corrosion protecting conversion coating in the line prior to the paint application. The conversion coating is applied by contacting the metal strip with an aqueous, complex, chemical solution. For example, a typical chromate conversion coating solution which is used contains chromate fluoride and cyanide ions.

These solutions are subject to the disadvantage that they require close pH control and careful regulation of the critical components of the complex solution.

In addition, conversion coatings are invariably applied in the preliminary stages of the paint strip line. If there is a delay before the paint is applied to the conversion coated surface, unacceptable adhesion and poor weathering endurance are apt to result. Still further, conversion coating equipment frequently requires a high proportion of the total capital outlay in the machinery and floor space required for the conversion coating stages. Further, the continuing cost of the chemical conversion coating treatment is quite expensive due to the high chemical cost, the difficult control problems and the high maintenance cost. An additional and troublesome problem with conversion coating or similar treatments is that frequently these treatments utilize high concentrations of chemical materials and high toxicity materials.

In addition to the foregoing significant and troublesome disadvantages attendant upon conventional pretreatment of aluminum, the conventional treatments frequently attain results which are either not acceptable or leave much to be desired.

Accordingly, it is a principal object of the present invention to provide an improved method for treating aluminum or aluminum base alloys which renders the metal susceptible to further coating processes.

It is an additional object to provide an improved article resulting from said treatment and further an improved coated article.

It is a further object of the present invention to provide a process as aforesaid which enables a coated metal article having improved adhesion and durability of the coating.

It is a further object of the present invention to provide a process for treating metals as aforesaid which is inexpensive and readily usable on a commercial scale.

It is a still further object of the present invention to provide a process for treating metals which utilizes a treating solution of low toxicity and low concentration, and which requires only simple pH control.

It is an additional object of the present invention to provide an improved process for treating metals to render the metal more susceptible to further coating treatment, which improved process may be performed if desired with significant time delays prior to the coating process.

In general, it is a particular object of the present invention to provide an improved process as aforesaid which overcomes the substantial and significant disadvantage of conventional treatment procedures.

It is another object of the present invention to provide additional amine and hydrazine derivatives which may be used in addition to those disclosed in Ser. No. 448,288.

It is another object of the present invention to provide treating agents which may be used in lower concentrations than those specified in Ser. No. 448,288.

It is still another object of the present invention to provide a more advantageous and more improved acid rinse treatment to be used after the alkaline treatment.

Further objects and advantages of the present invention will appear hereinafter.

The process of the present invention comprises contacting aluminum, including base alloys thereof, for from 5 seconds to one minute, and preferably 5 to 15 seconds, with a solution containing purified water, preferably having a specified resistance of at least 9.5 megohm-centimeters, for example, deionized water or distilled water, and from 0.0001 to 0.3% by weight of an amine selected from the group consisting of methylaminobispropylamine, methoxypropylamine, aminopropylmorpholine, dimethylaminopropylamine, and aminobispropylamine, and/or a hydrazine derivative selected from the group consisting of monomethylhydrazine and $\alpha,\alpha$-dimethylhydrazine, which is an aqueous solution in the pH range of 7 to 11, said solution being at a temperature of from 85° C. to boiling.

The following table shows the structure of the foregoing amines and hydrazine derivatives together with the effective concentrations for the process of the present invention.

TABLE

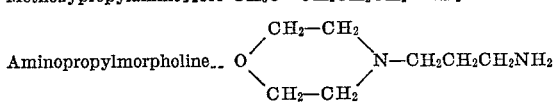

| Name | Structure | Effective concentration range investigated, wt. percent |
|---|---|---|
| Methylaminobispropylamine. | $NH_2-CH_2CH_2CH_2-\underset{\underset{CH_3}{\mid}}{N}-CH_2CH_2CH_2-NH_2$ | .01-.0001 |
| Methoxypropylamine | $CH_3O-CH_2CH_2CH_2-NH_2$ | .01-.0001 |
| Aminopropylmorpholine | (morpholine ring)$N-CH_2CH_2CH_2NH_2$ | .1-.0001 |
| Dimethylaminopropylamine. | $(CH_3)_2N-CH_2CH_2CH_2-NH_2$ | .01-.0001 |
| Aminobispropylamine | $NH_2-CH_2CH_2CH_2-NH-CH_2CH_2CH_2-NH_2$ | .01-.0001 |
| Monomethylhydrazine | $CH_3NHNH_2$ | .1-.0001 |
| $\alpha,\alpha$ dimethylhydrazine | $(CH_3)_2NNH_2$ | .1-.0001 |

It is a particular and surprising advantage of the present invention that the foregoing process attains such improved results with very short contact times, with in fact, the preferred contact times being from 5 to 15 seconds. It is particularly surprising that such improved results can be attained with contact times of such a short duration.

In general, the improved characteristics of the instant treatment process include a process characterized by lower concentration, lower chemical cost and easier maintenance and control characteristics than conventional processes. In addition, the present process requires only simple pH control as compared to conventional frequent pH monitoring plus frequent titration. In addition, the chemical treatment process of the present invention utilizes lower toxicity materials and an easily handled single component solution, as compared to chromate conversion coating solutions which use highly toxic chromates, fluorides and cyanides at relatively high concentrations. Still further, the delay between the treatment of the present invention and subsequent coating does not present a problem in the present process.

In addition, the present invention attains a greatly improved process for treating metals, as indicated above, that retains the natural appearance of the metal without sacrificing effectiveness of the treatment. This makes possible the use of clean, unpigmented coatings on the metal with better adhesion and durability than was possible heretofore. In addition, the elimination of toxicity makes it easier for the processor who is having difficulty handling and disposing chromate conversion coating solutions. Also, chromate conversion coatings are unsuitable for aluminum cans used for food packaging which require a pretreatment before being lacquered and the present process overcomes this difficulty.

Perhaps of even greater significance is the fact that aluminum treated in accordance with the present process is characterized by improved durability of coatings, such as paint, than has been conventionally attained.

The present invention may be used with any aluminum base alloy, for example, high purity aluminum or aluminum base alloys may be readily used. Exemplificative alloys which may be utilized include but are not limited to aluminum alloys 1100, 2014, 2024, 3003, 3004, 4043, 5005, 5052, 5083, 5086, 6061, 6063, and 7075.

The treatment solution of the present invention is contacted with the aluminum for a period of from 5 seconds to one minute and preferably from 5 to 15 seconds. In fact, it has been found that preferred results are obtained in the shorter times of 5 to 15 seconds. The fact that improved results may be obtained with such short treatment times renders the present process particularly suitable to a commercial operation utilizing a roll coating process in, for example, a paint strip line. The roll coating process requires that pretreatment times of the order of 10 to 15 seconds be used since at line speeds of 200 to 300 feet per minute practical limits of the length of treatment baths are soon reached. In conventional conversion coating processes, the requirement for short contact times requires the addition of special chemicals, such as fluorides to conversion coating treatments so that the treatment provides sufficient bite to the aluminum surface in the short treatment time available. It is a particular advantage of the present invention that painted aluminum panels pretreated in accordance with the present process at treatment times of less than 15 seconds have shown superior durability performance in accelerated tests despite the absence of special chemicals, such as fluorides.

The treatment solution of the present invention utilizes purified water, i.e., water which has its impurities removed. In general, the water should have a specific resistance of at least 0.5 megohm-centimeter, generally not above 4 megohm-centimeters, and preferably from 1½ to 2½ megohm-centimeters. Typical methods for obtaining this purified water include preferably utilizing deionized water or distilled water.

The process described in Ser. No. 448,288 utilizes from 0.001 to 0.3% by weight of an amine. Any amine, either primary, secondary, or tertiary, organic or inorganic may be utilized provided that the amine maintains an aqueous solution pH in the range of 7 to 11. Preferred amines which may be utilized include, but are not limited to the following: diethylenetriamine, ethylenediamine, monoethanolamine, methyl diethanolamine, hydrazine, diethylamine, triethanolamine, amylamine, benzylamine, 1-methylheptylamine, cyclohexylamine, phenethylamine, n-heptylamine, n-hexylamine, diphenylamine, dipropylamine, dibutylamine, diisoamylamine, p-phenylenediamine, o-phenylenediamine, tributylamine, 2-ethylpyridine and 4-ethylpiperidine.

In general, the amine and/or hydrazine derivative which is used should not be volatile and the preferred amines will maintain a water solution in the pH range of 8.9 to 10.8.

The concentration of the amine and/or hydrazine derivative may vary from 0.0001 to 0.3% by weight, with the preferred concentrations being from 0.001 to .01% by weight. It is apparent that less hydrazine derivative is required than according to Ser. No. 448,288. Equally good results are obtained with less treating agent according to the present invention.

It should be noted that the solutions of amines and hydrazine derivatives are characterized by a significantly lower order of toxicity in comparison to the chemicals used in conventional conversion coating solutions. In addition, the foregoing solutions of the present invention use lower concentrations of materials than conventional conversion coating solutions, which makes for easier solution handling and obviates waste solution disposal. Furthermore, the solutions of the present invention are characterized by low toxicity, particularly in comparison with conversion coating solutions. A further advantage of the foregoing solutions is the lower chemical costs and treatment costs which they achieve.

The solution should be maintained at a temperature of from 85° C. to the boiling point and a pH of from 7 to 11.

Treatment in accordance with the present process results in a film of from 5 to 200 millimicrons in thickness. This film is an oxide film and is in general uniformly applied in order to provide effective protection against corrosive degradation.

The contact necessary between the aluminum and the treatment solution may be achieved in any desired manner. For example, the contact may be had by immersing the metal in the solution, roll coating the solution or spraying the metal.

It is preferred to utilize aluminum which is clean prior to the treatment. Conventionally, this may be achieved by employing relatively clean aluminum or by preceding the treatment stage with a cleaning stage which uniformly removes dirt or other matter from the surface of the article to be treated. For example, frequently a film of aluminum soap from the rolling lubricant is found on the surface of the aluminum article. All conventional methods of cleaning may be conveniently employed.

Some conventional methods of cleaning which may be used include:

(1) Immerse for 30 seconds in a 10 to 15 percent aqueous solution of sodium hydroxide at 60° C. The surface may be scrubbed with a soft fiber brush if required. Follow with a thorough rinse in clean water.

(2) Dip for 30 to 40 seconds in an aqueous solution consisting of 20 to 30 percent nitric acid and 4 percent sodium fluoride at room temperature. Follow by washing in water.

(3) Immerse for 2 minutes in 5 percent sodium hydroxide at room temperature. Wash in water and then immerse for 30 seconds in 50 percent nitric acid and rinse in water.

(4) Clean with an abrasive brush and rinse thoroughly with water.

The process of the present invention is particularly effective on aluminum which is to be subsequently painted. All types of paints are, of course, contemplated, for example, vinyl, alkyd, acrylic and urethane paint systems. The process of the present invention improves the adhesion and durability of any paint system used on aluminum. In addition, the process of the present invention is quite effective in improving the durability of adhesively bonded structures.

It should be particularly noted that the treated aluminum article need not be coated immediately after treatment. The treated aluminum article may be subjected to excessive delays prior to subsequent treatment without impairing the improved characteristics of the coated article.

It should be particularly noted that the process of the present invention is carried out with relatively innocuous materials at very low concentrations so that it is essentially non-toxic. Even lower concentrations are required with the amine and/or hydrazine derivative treatment of the present invention than according to the process of Ser. No. 448,288. This offers two important advantages over chromate conversion coating. First, solutions are safe to handle and waste disposal is not a problem for the processor. Secondly, the process can be used safely and acceptably for aluminum food cans and containers. In addition, the best chromate conversion coatings produce an uneven yellow color on the metal surface which makes them unsuitable for clear coatings. The process of this invention does not impair the attractive metal appearance, thus making it suitable for use with clear coatings. It should also be noted that the chemistry of our process is relatively simple, whereas that of chromate conversion coating is complex and critical. Thus, this process is easier to control under commercial operating conditions. Also the availability and low cost of the chemicals for carrying out this invention are inexpensive and combined with the low concentrations required offer lower material costs than are available with chromate conversion coatings. Furthermore, the speed with which the objectives of this invention are obtained makes it suitable for continuous type treatment as in a roll coating paint line which may operate up to 300 feet per minute.

The present invention contemplates the use of additional substituents in the treatment solution to achieve particular results, or prior or subsequent treating solutions, for example, suitable wetting agents may be used in the prior cleaning solution to facilitate that operation or the subsequent rinsing solution may be slightly acidified to provide some improvement in the process, particularly on magnesium containing alloys.

According to another feature of the present invention, a subsequent treatment is provided in which the aluminum articles are given an acid rinse. An acid rinse is required for aluminum alloys containing magnesium. Acids which may be used for this purpose include phosphoric, citric, oxallic, tartaric, and glycollic. While chromic acid may also be used in the acid rinse, the previous mentioned acids are preferred because they are not toxic. Phosphoric acid is particularly preferred for cost reasons. Furthermore, if this acid treatment is used, aluminum food containers can be processed in the acid treatment and used safely. Additionally, the use of these acids eliminates the difficulty of disposing of the toxic chromic acid. For example, acid concentrations necessary to give a pH of at least as low as 2.7, for instance, concentrations of 0.02 to 2.5 grams per liter phosphoric acid may be used.

This treatment may be applied to the alkaline treatment described herein and that described in Ser. No. 448,288.

It is to be understood that the invention is not limited to the illustrations described and shown herein which are deemed to be merely illustrative of the best modes of carrying out the invention, and which are susceptible of modifications of form, size, arrangement of parts and detail of operation, but rather is intended to encompass all such modifications which are within the spirit and scope of the invention as set forth in the appended claims.

What is claimed is:

1. The process which comprises contacting aluminum for from 5 seconds to less than 15 seconds with a solution consisting essentially of purified water and from 0.0001 to 0.3% by weight of a substance selected from the group consisting of methylaminobispropylamine, methoxypropylamine, aminopropylmorpholine, dimethylaminopropylamine, and aminobispropylamine, and/or a hydrazine derivative selected from the group consisting of monomethylhydrazine and $\alpha,\alpha$-dimethylhydrazine, at a pH in the range 7 to 11, said solution being at a temperature of 85° C. to boiling, and then adhesively coating said aluminum with a dissimilar material.

2. A process according to claim 1 wherein said purified water is deionized water having a specific resistance of at least 0.5 megohm-centimeter.

3. A process according to claim 1 wherein said purified water is distilled water having a specific resistance of at least 0.5 megohm-centimeter.

4. A process according to claim 1 in which the aluminum is given an acid rinse after the treatment specified in claim 1.

5. A process according to claim 4 in which the acid is selected from the group consisting of citric, oxallic, tartaric, glycollic, and phosphoric acid.

6. A process according to claim 1 wherein said aluminum is aluminum strip moving at the rate of 200 to 300 feet per minute.

7. The process which comprises: contacting aluminum for from 5 seconds to less than 15 seconds with a solution consisting essentially of purified water and from 0.0001 to 0.3% by weight of a substance selected from the group consisting of amines and hydrazines having a pH in the range 7 to 11, said solution being at a temperature of 85° C. to boiling, rinsing said aluminum in an acid solution, and then adhesively coating said aluminum with a dissimilar material.

8. A process according to claim 7 wherein said amine is selected from the group consisting of diethylenetriamine, ethylenediamine, monoethanolamine, methyl diethanolamine, hydrazine, diethylamine and triethanolamine.

9. A process according to claim 8 in which said substance is selected from the group consisting of methylaminobispropylamine, methoxypropylamine, aminopropylmorpholine, dimethylaminopropylamine, and aminobispropylamine, and/or a hydrazine derivative selected from the group consisting of monomethylhydrazine and $\alpha,\alpha$-dimethylhydrazine.

10. The process which comprises contacting aluminum for from 5 seconds to one minute with a solution consisting essentially of purified water and from 0.0001 up to an amount less than 0.001% by weight of a substance selected from the group consisting of methylaminobispropylamine, methoxypropylamine, aminopropylmorpholine, dimethylaminopropylamine, and aminobispropylamine, and/or a hydrazine derivative selected from the group consisting of monomethylhydrazine and $\alpha,\alpha$-dimethylhydrazine, at a pH in the range 7 to 11, said solution being at a temperature of 85° C. to boiling.

11. The process which comprises: contacting aluminum for from 5 seconds to one minute with a solution consisting essentially of purified water and from 0.0001 up to an amount less than 0.001% by weight of a substance selected from the group consisting of amines and hydrazines having a pH in the range 7 to 11, said solution being at a temperature of 85° C. to boiling, and rinsing said aluminum in an acid solution.

References Cited

UNITED STATES PATENTS

| | | | |
|---|---|---|---|
| 1,946,151 | 2/1934 | Edwards | 204—35.1 X |
| 2,126,954 | 8/1938 | Edwards | 204—35.1 |
| 2,665,243 | 1/1954 | Young et al. | 204—35.1 |
| 3,210,184 | 10/1965 | Vhlig | 204—35.1 |
| 3,247,026 | 4/1966 | Switzer | 148—6.27 X |

FOREIGN PATENTS

| | | |
|---|---|---|
| 719,680 | 10/1965 | Canada. |
| 630,229 | 7/1963 | Belgium. |
| 643,501 | 5/1964 | Belgium. |

RALPH S. KENDALL, Primary Examiner

U.S. Cl. X.R.

148—6.14, 6.15